Oct. 28, 1952    R. C. RIFENBURG    2,615,952
STOP FOR FLUID FILLED CABLE SYSTEMS
Filed May 13, 1950    2 SHEETS—SHEET 1

INVENTOR.
RAY C. RIFENBURG.
BY Ward, Crosby & Neal
ATTORNEYS.

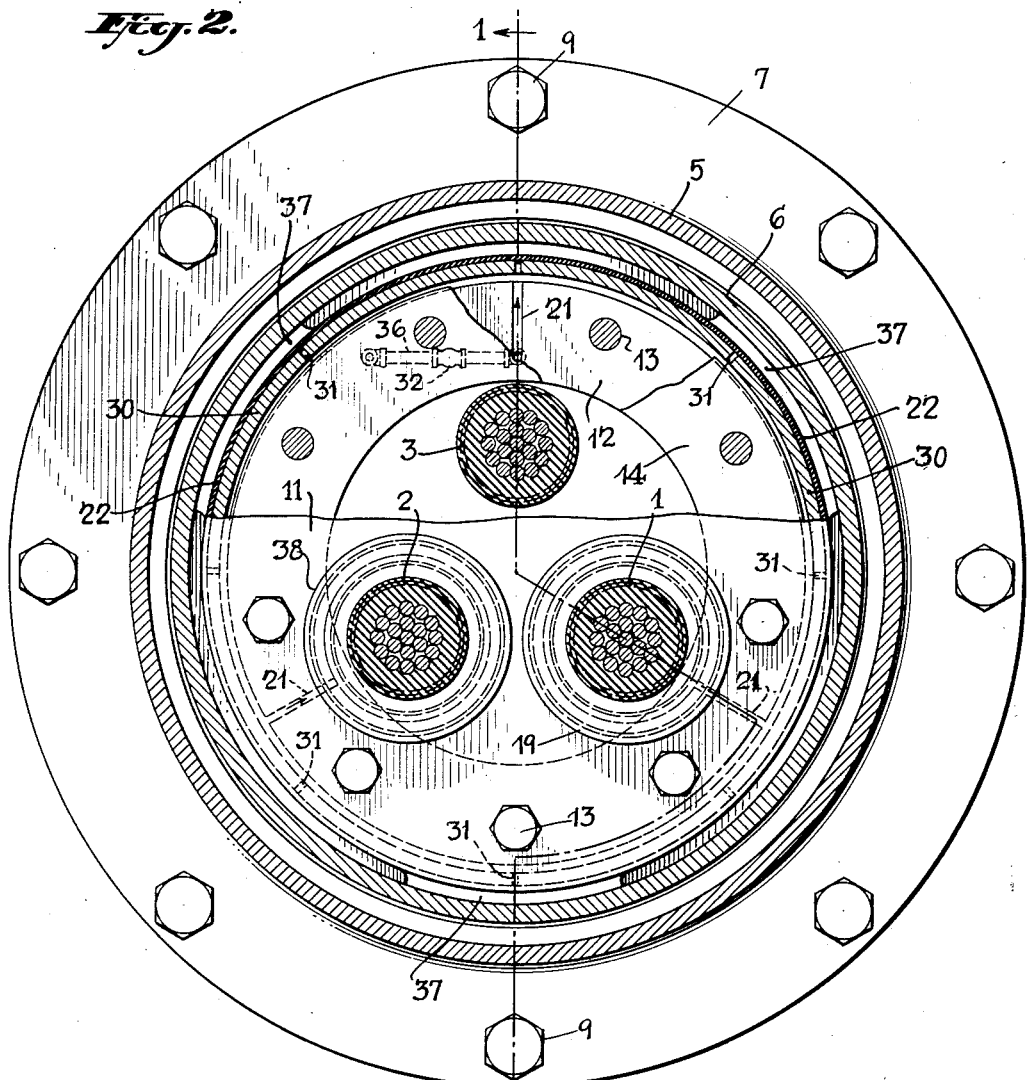
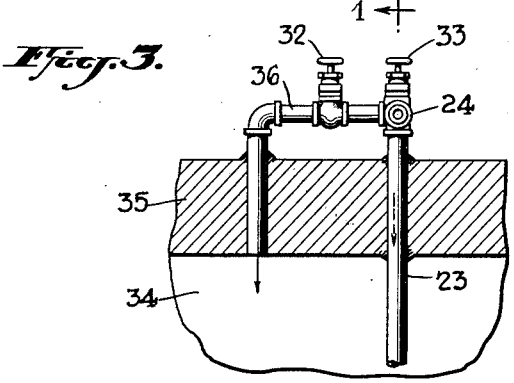

Patented Oct. 28, 1952

2,615,952

UNITED STATES PATENT OFFICE 2,615,952

STOP FOR FLUID FILLED CABLE SYSTEMS

Ray C. Rifenburg, Brooklyn, N. Y., assignor to Consolidated Edison Company of New York, Inc., New York, N. Y., a corporation of New York Application May 13, 1950, Serial No. 161,791

7 Claims. (Cl. 174—23)

This invention relates to stops or barriers for cable systems in which the cable is surrounded by a fluid and particularly to stops for use in cable systems in which multiple cables are surrounded by a fluid filled conduit and in which it is desired temporarily to prevent the flow of fluid from one portion of the conduit to another.

The invention finds particular application in high voltage cable systems comprising two or more cables located in a conduit which is filled with an insulating fluid, such as oil. When a break occurs in a portion of the conduit or when it is necessary to repair or replace the cable within a portion of the conduit, it is desirable to isolate one section of the conduit from another in so far as the insulating fluid is concerned. By isolating one section of the conduit from another, it is unnecessary to remove all of the fluid from the entire length of conduit, and if the load circuits are so arranged, the portion of the cable not being repaired or removed can retain its normal supply of fluid.

In the use of high voltage cables of the above mentioned type for power distribution purposes, the current carried by the cable varies from time to time, depending upon the power demand at any particular time. This variation of current, as well as any interruptions of the current, produce changes in the temperature of the cable, and therefore cause the cable to expand and contract. Due to the fact that the cable is relatively long, the lengthwise motion of the cable is quite appreciable when the temperature of the cable changes from one extreme to another.

In addition to the lengthwise motion of the cable, the diameter of the cable may also change with the variation in load current. It is, therefore, apparent that if the cable or its conductors are tightly encircled by any form of packing or other stop device for preventing flow of the fluid, which packing or device is fixed in position with respect to the conduit, the contraction and expansion of the cable both lengthwise and in diameter causes abrasion or compression of the cable insulation. Over a period of time, such abrasion can cause damage which eventually may cause failure of the cable or of the stop means.

In the past, two types of stops have been available for the above mentioned purposes. The first type employs a packing in a stuffing box around each cable or each conductor of the cable. In this type of construction, the packing is arranged to encircle the cable tightly and a packing nut or other clamping means is employed to force the packing into contact with the cable. This type of construction has required that the packing nut or other clamping means be within the conduit and, therefore, the packing is compressed against the cable at all times. The packing with its compressing means is held in a fixed position relative to the conduit and, consequently, the cable must either buckle or force itself through the packing, even though the packing is tightly pressed against the cable. This type of stop is subject to the above explained objection that it may cause wear and damage to the insulation of the cable.

A second type of stop employs a diaphragm surrounding the cable. The inner portion of the diaphragm is permanently affixed to the cable and the outer portion of the diaphragm is permanently affixed to a circular gland which is attached to the barrier. This type of stop is effective in reducing the abrading action on the cable when the extent of the cable movement is small. However, the amount of movement which can be obtained with a diaphragm that is sufficiently rigid to withstand the fluid pressures is not always satisfactory. In addition, due to the continual flexing of the diaphragm which must occur during varying load cycles, the life of the diaphragm is reduced over that which would be obtained if there were no flexing.

With both of the above types of stops, a by-pass is provided around the stop during the time that the conduit system is closed and the cable is in operation to permit free flow of fluid throughout the entire length of the conduit. When the conduit is sectionalized, the by-pass which is external to the conduit is closed. The use of a by-pass external to the conduit increases the external size of the conduit assembly and may not always provide a direct reliable passage for the free flow of the fluid from one cable section to another as is desirable when the system is in normal operation.

As mentioned above, the stop or barrier in the conduit is required primarily for isolating one portion of the conduit from another only for periods which ordinarily are short compared to the time the cable is in service. Therefore, it is not necessary that the stop be in tight contact with the cable at all times. In accordance with the present invention, the stop is arranged so that it is in contact with the cable only during the short periods that a portion of the cable or conduit is being repaired.

The stop of this invention is an improvement over the above mentioned stops, and comprises a rigid barrier member which has a fluid-tight connection with the surrounding conduit wall and which has apertures through which the cables may pass freely. The barrier member is, in the preferred form of the invention, rigidly connected to the wall of the conduit. A flexible diaphragm which encircles the cable or one of its conductors is mounted in the aperture of the rigid barrier member in such a manner that it forms a fluid-tight connection therewith when the stop is in use. The aperture in the diaphragm is of such a size normally that the inner surface is spaced from the cable or conductor. A fluid under pressure, such as an inert gas, is applied to the side of the diaphragm remote from the cable or conductor so that the diaphragm tightly encircles the cable or conductor, but only when the stop is in use for preventing flow of fluid from one portion of the conduit to another.

When the stop is not in use, it is desirable that a fairly large passageway be provided through the stop between one section of the conduit on one side of the stop and the other section on the other side of the stop. The cable used in the conduit and its conductors are relatively small in diameter and, therefore, the diaphragm surrounding the cable or its conductors must also be small in diameter. Obviously, with a diaphragm of small diameter and in view of the elastic limits of diaphragm materials, it may not be possible always to provide a large flow space between the diaphragm and the cable when the stop is not in use. In the preferred embodiment of this invention, a further diaphragm is provided around the outside of the rigid barrier member, between the peripheral surface of such member and the inner surface of the conduit. In its normal position, this further diaphragm is spaced from the inner wall of the conduit and because of the relatively large diameter of the diaphragm, a greater flow space can be provided which space permits a much larger flow between the two sections of the conduit than would be obtained if solely the space between the smaller diaphragms and the cables were relied upon to provide the necessary flow. A fluid-tight channel communicates with the inner surface of the further diaphragm so that when fluid under pressure is introduced into the channel, the diaphragm expands until it makes contact with the inner wall of the conduit.

Therefore, the stop of the present invention permits the fluid to pass freely through the stop when the stop is not being used for preventing flow of fluid from one part of the conduit to another and external fluid by-passing equipment becomes unnecessary. By virtue of suitable fluid pressure connections to the channel's communicating with the surfaces of the diaphragms, it is possible to close off the conduit at any desired time. In addition, when the stop is not in use, the connections permit the fluid normally employed in the conduit to flow in the channel, thereby equalizing the pressures on the two faces of the diaphragms. By the use of a further diaphragm in accordance with the preferred embodiment of the invention, a large passage space between the sections of the conduit on each side of the stop is provided. Since a close fit between the stop and the cable is not required, the stop is simply and easily installed.

The invention thus provides a stop which is easy to install and simple to operate and has a comparatively long life.

The invention thus also provides a stop which normally has substantially no pressure contact with the cable or conductors passing therethrough, and which in its normal state permits free flow of fluid from one portion of a cable conduit to another.

Other features, objects and advantages of the invention will be apparent from the following description read in connection with the accompanying drawings, in which:

Fig. 2 is a sectional view of such stop, taken at right angles to the view shown in Fig. 1; and Fig. 3 illustrates the details of the valves and connections employed for operating the diaphragms of the stop.

Figure 1:
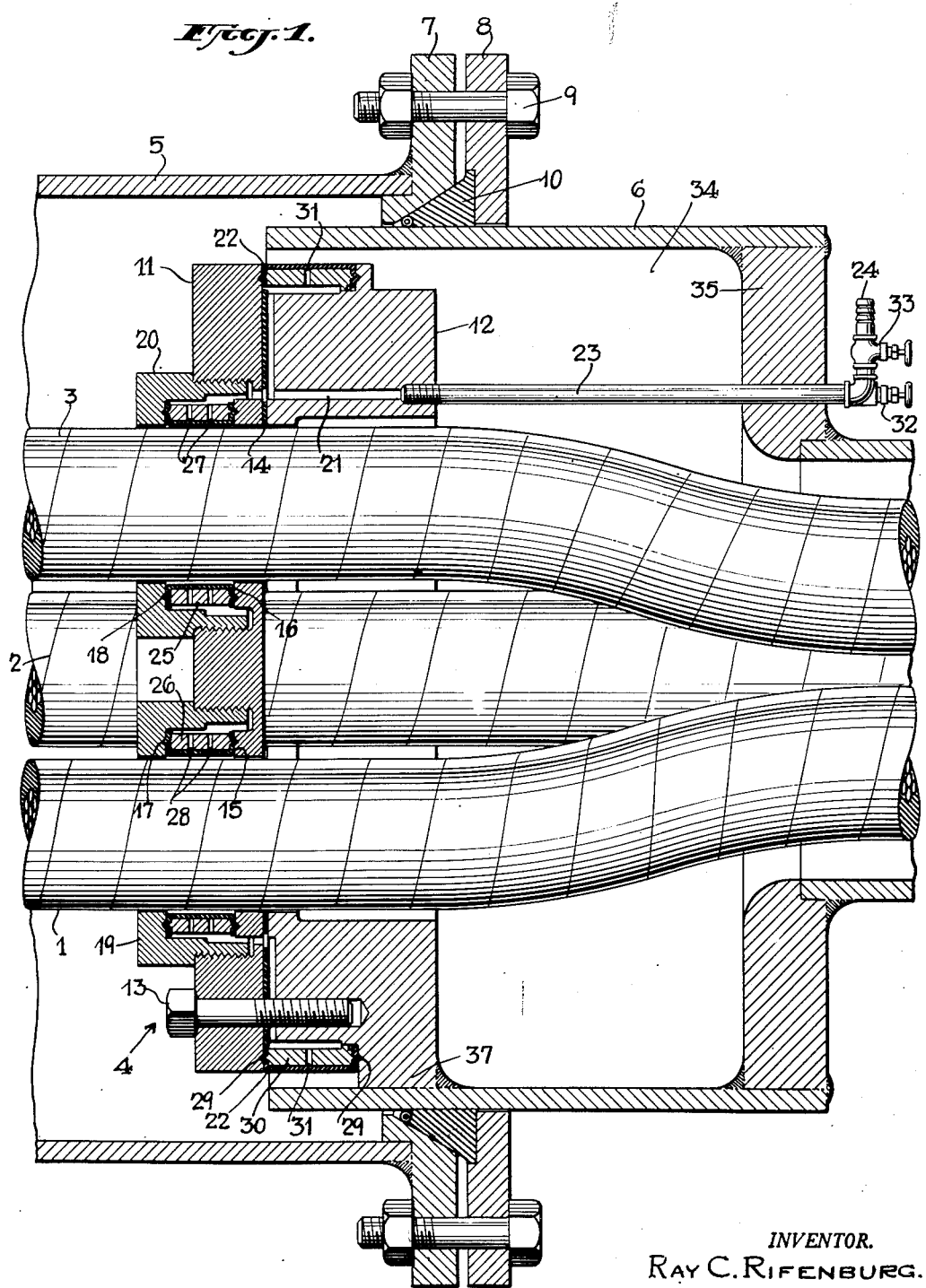
Fig. 1 is a substantially a longitudinal cross-section view of the stop of the invention in its preferred form installed in a conduit.

As shown in Figs. 1 and 2, a cable comprising, for example, three insulated conductors 1, 2 and 3 passes through the stop indicated generally at 4. The cable, as here shown, is surrounded by conduit joint portions comprising two pipe sections 5 and 6 held together, for example, by means of flanges 7 and 8 and bolts 9. A fluid-tight connection is provided between the pipes by means of the gasket 10 which is compressed between the flanges 7 and 8. An enlarged joint portion of the conduit is here shown surrounding the stop but it will be apparent that the stop may be located at a portion of the conduit having the same diameter as the remaining portions of the conduit.

The stop 4 comprises a rigid structure including a conductor spacing or separating member 11 fastened to a ring 12 with a gasket 14 therebetween, by means of a series of bolts 13, and three collars 19, 20 and 38. The member 11 and said collars are preferably made of non-ferrous material so as to keep to a low value the permeability of the magnetic path between the conductors. The ring 12 may be a ferrous ring because it does not extend between the conductors of the cable.

Each conductor of the cable is surrounded by a diaphragm, as shown at 15 and 16. The diaphragms are held in place and are made fluid-tight with respect to the rigid structure of the stop by means of the non-ferrous collars as at 19 and 20, by means of the annular projecting portions as at 17 and 18 and by means of relatively stiff rings as at 25 and 26. The collars in conjunction with the member 11 form annular cavities which receive the diaphragms 15 and 16. The rings 25 and 26 have numerous apertures as at 27 and 28 therethrough for the admission of fluid to the surfaces of the diaphragms 15 and 16 as will hereinafter be described.

The ring 12 may have a fluid-tight connection around the entire external periphery thereof with the inner wall of the pipe or conduit 6 if desired. However, in the preferred embodiment of the invention, ring 12 is rigidly connected to the conduit wall only at spaced portions as at 37 and is spaced from the wall around the remainder of its periphery. A diaphragm 22 is provided around the periphery of the ring 12 in a cavity formed at the periphery of the ring by the ring itself and by member 11. This diaphragm 22 is similar in construction to the diaphragms 15 and 16 and is held in place by the member 11, the annular projections 29 and the relatively stiff ring 30. Ring 30 has a series of holes 31 therethrough for the same purposes that the holes or apertures 27 and 28 have been provided in the rings 25 and 26.

A channel 21 which extends from a connecting pipe 23 to the holes 31 in the ring 30 and the holes 27 and 28 in the rings 25 and 26 is provided for the purpose of introducing fluid under pressure from an external source, such as a tank of nitrogen under pressure (not shown) which may be connected temporarily to a nipple 24 when the stop is to be made effective. As shown in Fig. 2, this channel extends to the rings behind each of the diaphragms surrounding the cable conductors.

When the cable is in operation and all sections of the conduit are filled with the insulating fluid, the flexible diaphragms 15, 16 and 22 are in the positions shown in Fig. 1. It will be noted that the diaphragms 15 and 16 are not in contact with the conductors. In addition, there is substantially no pressure of contact between the conductors and the separating member 11 or the collars 19 and 20. When it is desired to isolate the section of the conduit terminating in pipe section 6 from the section of the conduit terminating in pipe portion 5, fluid under a pressure greater than the fluid surrounding the cable is introduced into channel 21 by way of nipple 24 and connecting pipe 23. This fluid causes the diaphragms 15, 16 to bulge inwardly and diaphragm 22 to bulge outwardly. Diaphragms 15 and 16 press tightly against their respective conductors forming fluid-tight connections therewith and diaphragm 22 makes a fluid-tight connection with the inner surface of the conduit portion 6. The insulating fluid in either section of the conduit may then be removed without affecting the fluid in the other section of the conduit.

While the cable is in operation, it is preferable that the pressures on both sides of the diaphragms 15, 16 and 22 be substantially equal. A relatively simple arrangement for equalizing the pressures is shown in Fig. 3. In the normal operating state, the valve 33 also shown in Fig. 1 is closed. Valve 32 which controls a path from the compartment 34 through end wall 35 and pipe 36 to connecting pipe 23 is normally open. Thus, the fluid in the compartment 34 can flow from this compartment to the channel 21 and thus provide pressure on the outer surfaces of diaphragms 15 and 16 and on the inner surface of diaphragm 22, which pressure is equal to the pressure of the fluid on the opposite surfaces of these diaphragms. When the stop is to be put into use, the valve 32 is closed and the valve 33 is opened to permit the introduction of fluid from an external source into the channel 21. This fluid employed for the operation of the stop may, of course, be the same as or different from the fluid used to surround the cable.

Diaphragms 15, 16 and 22 may be constructed of any flexible, impervious material, preferably elastic, which will withstand the pressures employed to operate the diaphragms and the fluid used in the conduit. If oil is used as the fluid, the material employed is preferably a suitable oil resistant synthetic rubber. If gas is employed as the fluid, the material may be rubber, for example.

While the principles of the invention have been described in connection with a specific form of apparatus, it is to be understood that the description has been given by way of example only and other modifications thereof, which will be readily apparent to those skilled in the art, may be made without departing from the scope of the invention which is defined by the claims appended hereto.

What is claimed as new and desired to be secured by Letters Patent of the United States is:

1. A stop construction for temporarily preventing the flow of fluid from within one section to another of a cable arrangement of the type having a plurality of insulated conductors contained within a pipe or the like filled with fluid, such stop comprising rigid barrier means having apertures therein for permitting each of the insulated conductors normally to pass therethrough with clearance space around each, a generally annular, flexible diaphragm secured around the periphery of each of said apertures, a generally annular, flexible diaphragm secured around the periphery of said barrier means, said barrier means being formed with generally annular cavities surrounding each of said first-named diaphragms and an annular cavity inside said second-named diaphragm, and fluid connection means communicating with said cavities and adapted to extend to the exterior of the pipe, said cavities and connection means being fluid-tight whereby upon applying fluid under pressure to said connections, the said first-named diaphragms will be expanded inwardly for embracing said insulated conductors and said second-named diaphragm will be expanded outwardly for engagement with the interior walls of the pipe.

2. A stop for temporarily preventing flow of fluid from one portion to another of a cable arrangement of the type having a plurality of insulated conductors contained within a conduit or the like filled with fluid, such stop comprising rigid barrier means having apertures therethrough, each aperture being larger than the cross section of one of said conductors, a plurality of flexible, annular diaphragms, each diaphragm being mounted coaxially with an aperture in said means and having fluid-tight engagement with said means, a further flexible, annular diaphragm extending around the periphery of said means, said further diaphragm also having fluid-tight engagement with said means, and means for supplying fluid under pressure to the outer surfaces of said plurality of diaphragms and to the inner surface of said further diaphragm.

3. A stop for temporarily preventing flow of fluid from one portion to another of a cable arrangement of the type having a plurality of insulated conductors contained within a conduit or the like filled with fluid, such stop comprising rigid barrier means having apertures therethrough, each aperture being larger than the cross section of one of said conductors, a plurality of flexible, annular diaphragms, each diaphragm being mounted coaxially with an aperture in said means and having fluid-tight engagement with said means, the diameter of each said annular diaphragm normally being larger than said cross section, a further flexible, annular diaphragm extending around the periphery of said barrier means and also having fluid-tight engagement with said means, and means for alternatively supplying fluid under a first predetermined pressure and fluid under a higher pressure to the outer surfaces of said plurality of diaphragms and to the inner surface of said further diaphragm.

4. A stop for temporarily preventing flow of fluid from one portion to another of a cable arrangement of the type having a plurality of insulated conductors contained within a conduit filled with fluid, such stop comprising rigid barrier means having a generally annular cavity around the periphery thereof and comprising a non-magnetic member having a plurality of apertures therein permitting free passage of said conductors therethrough and having a generally annular cavity around each aperture, a plurality of flexible, generally annular diaphragms, one diaphragm being mounted to extend around in each of said cavities and each annular diaphragm normally being of a size sufficient to permit a conductor of said cable to pass freely therethrough, and a fluid-tight channel communicating with the cavities around said first-mentioned apertures and around the periphery of said member, a further flexible, generally annular diaphragm mounted to extend around in said cavity in the periphery of said barrier means, and means for supplying a fluid under pressure to said channel, whereby said diaphragms may be distended by said fluid.

5. A stop for a cable system comprising a plurality of cables encircled by a cylindrical conduit adapted to contain a fluid and for temporarily preventing flow of fluid from one portion of the conduit to another, said stop comprising a rigid, substantially circular member of non-magnetic material, said member having a plurality of apertures therein which are larger than the cross section of said conductors, means for rigidly connecting said member to said conduit at spaced points around the periphery thereof, the periphery of said member at other than said spaced points being smaller than the inner surface of said conduit, said member further comprising an annular cavity around each of said apertures and an annular cavity in the periphery thereof, a fluid-tight channel communicating with each of said cavities, a plurality of flexible, annular diaphragms, one mounted in each cavity surrounding said apertures and each diaphragm having an internal opening normally greater than the outside of one of said conductors, a further flexible, annular diaphragm mounted in the cavity in the periphery of said member, the external size of said further diaphragm normally being less than the internal size of said cylindrical conduit, and means for supplying fluid under pressure to said communication channel whereby when fluid is introduced into said channel, said plurality of diaphragms contract and said further diaphragm expands.

6. A stop for a cable system comprising a conductor encircled by a conduit adapted to contain a fluid and for temporarily preventing flow of fluid from one portion of the conduit to another, said stop comprising a rigid member adapted to be mounted in said conduit, said member having an external periphery which is less than the distance around the inner wall of said conduit and having an aperture therein which is larger than the cross section of said conductor, a first flexible annular diaphragm coaxial with the aperture in said member, said annular diaphragm normally being larger than the cross section of said conductor and said diaphragm having a fluid-tight connection around its edges with said member, a second flexible annular diaphragm encircling said aperture in said member, said second diaphragm having an external periphery adjacent the inner surface of said conduit and having a fluid-tight connection around its edges with said member, and means for supplying fluid under pressure to the outer surface of said first diaphragm and to the inside surface of said second diaphragm.

7. A stop for temporarily preventing flow of fluid from one portion to another of a cable arrangement of the type having a plurality of insulated conductors contained within a conduit filled with fluid, such stop comprising rigid barrier means having a generally annular cavity around the periphery thereof and having a plurality of apertures therein permitting free passage of said conductors therethrough, each of said apertures being surrounded by a generally annular cavity, a plurality of rigid, generally annular bands, one band being mounted to extend around in each of said cavities, a plurality of flexible, generally annular diaphragms, one diaphragm being mounted adjacent the external periphery of the band mounted in the annular cavity around the periphery of said rigid barrier means and each of the remaining diaphragms being normally of a size sufficient to permit a conductor of said cable to pass freely therethrough and being mounted adjacent the internal peripheries of the bands in the cavities surrounding said apertures and each of said diaphragms having its edges clamped between its associated band and the walls of the associated cavity, said bands having apertures therein extending from the internal to the external peripheries thereof, and a fluid tight channel communicating with said cavities and said apertures in said bands and means for supplying a fluid under pressure to said channel, whereby said diaphragms may be distended by said fluid.

RAY C. RIFENBURG.

REFERENCES CITED

The following references are of record in the file of this patent:

UNITED STATES PATENTS

| Number | Name | Date |
|---|---|---|
| 6,974 | Moat | Dec. 25, 1849 |
| 863,001 | Seebeck | Aug. 13, 1907 |
| 1,947,481 | Meyer | Feb. 20, 1934 |
| 2,467,150 | Nordell | Apr. 12, 1949 |

FOREIGN PATENTS

| Number | Country | Date |
|---|---|---|
| 6,982 | Germany | Sept. 19, 1879 |